United States Patent [19]

Lew

[11] Patent Number: 4,976,156
[45] Date of Patent: Dec. 11, 1990

[54] IMPULSE SENSOR WITH BALANCED MASS-STIFFNESS DISTRIBUTION

[76] Inventor: Hyok S. Lew, 7890 Oak St., Arvada, Colo. 80005

[21] Appl. No.: 429,155

[22] Filed: Oct. 30, 1989

[51] Int. Cl.$^5$ .............................................. G01F 1/32
[52] U.S. Cl. .................................... 73/861.24; 73/3; 73/862.68; 73/DIG. 4; 310/321; 310/323
[58] Field of Search ........... 73/861.22, 861.24, 862.68, 73/DIG. 4; 310/321, 323, 338

[56] References Cited

U.S. PATENT DOCUMENTS

| | | | |
|---|---|---|---|
| 4,248,098 | 2/1981 | Sawayama et al. | 83/861.24 |
| 4,258,565 | 3/1981 | Sawayama et al. | 73/DIG. 4 |
| 4,437,350 | 3/1984 | Tamura et al. | 73/861.24 |
| 4,699,012 | 10/1987 | Lew et al. | 73/861.24 |
| 4,835,436 | 5/1989 | Lew | 310/338 |

Primary Examiner—Herbert Goldstein

[57] ABSTRACT

An impulse sensor comprises a transducer container vessel of a cylindrical shape including a pair of stocky sections connected to one another by a midsection of a reduced cross section area, a force transmitting member extending from one end of the transducer container vessel and a force receiving member connected to the force transmitting member, wherein two Piezo electric elements are respectively contained in two cavities respectively included in the two stocky sections of the transducer container vessel. Each of the two Piezo electric elements has a pair of electrodes respectively disposed on the two opposite sides of a reference plane including the central axis of the combination of the transducer container vessel and the force transmitting member. Electrical signals supplied from the four electrodes are combined in such a way that the noises generated by the mechanical vibrations are cancelled and signals representing forces experienced by the force receiving member are obtained.

15 Claims, 3 Drawing Sheets

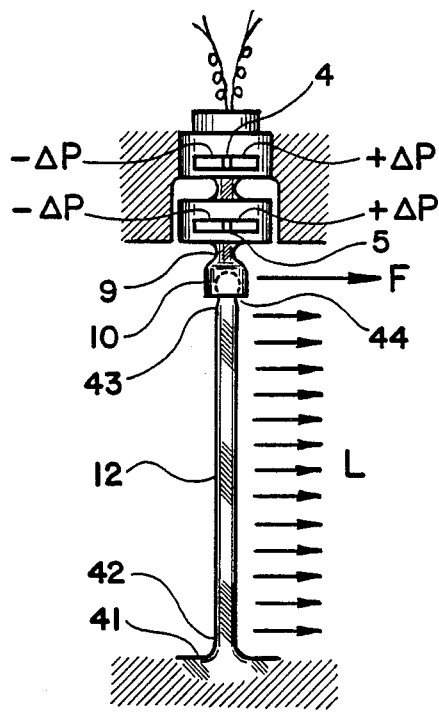
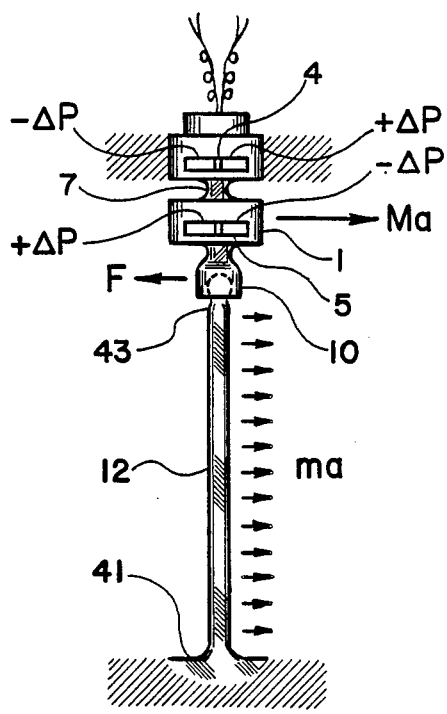
Fig. 8
Fig. 9
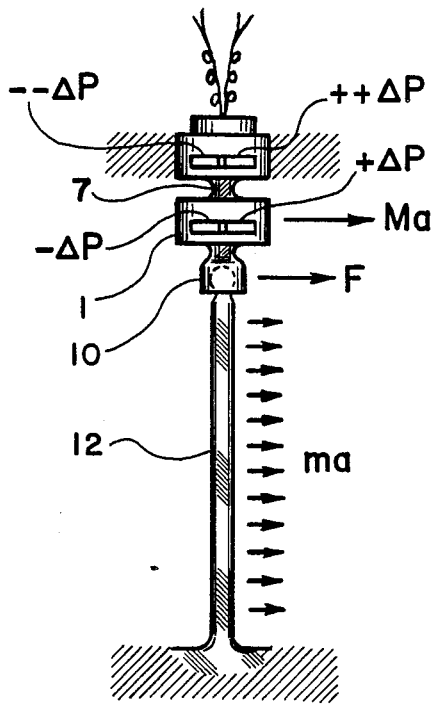
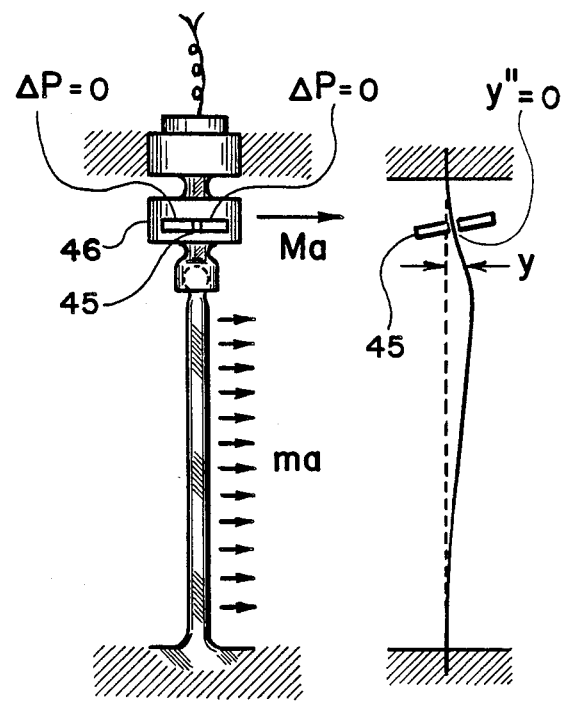
Fig. 10
Fig. 11-a
Fig. 11-b

IMPULSE SENSOR WITH BALANCED MASS-STIFFNESS DISTRIBUTION

BACKGROUND OF THE INVENTION

The vortex shedding phenomena takes place in a range of Reynolds numbers greater than 1,000 and less than 400,000, where the Reynolds number based on the width of the bluff body generating the vortices is a dimensionless flow characteristic number equal to the product of the fluid velocity and the width of the bluff body divided by the kinematic viscosity of the fluid. The existing vortex shedding flowmeters determine the fluid velocity from the vortex shedding frequency as the vortex shedding frequency is proportional to the fluid velocity. The second generation vortex shedding flowmeters can measure the mass flow rate of the fluid in addition to the fluid velocity, as the amplitude of the lift force created by the sinuating streamlines trailing the vortex generating bluff body and experienced by a vortex sensing planar member disposed downstream of the bluff body is proportional to the dynamic pressure of the fluid flow, that is equal to one half of the fluid density times the square of the fluid velocity. Since the vortex shedding phenomena take place in the range of Reynolds numbers greater than 500 and less than 400,000, a well designed vortex shedding flowmeter should measure flow velocities in a range wherein the ratio of the maximum measurable velocity to the minimum measurable velocity (the turn-down ratio of the flowmeter) should be at least a few hundred to one. In actuality, the best of the existing vortex shedding flowmeters available at the present time has a turn-down ratio no better than 20 to 1. The poor performance of the existing vortex shedding flowmeters is due to the inability to detect the vortex-generated signals selectively and reject the noise signals generated by the structural vibration of the pipe lines, as the vortex-generated signals at low fluid velocities are very weak and submerged under the level of the noise signals. In order to improve the performance of the vortex shedding flowmeters, the vortex sensor measuring the frequency of the vortex shedding and/or the amplitude of the alternating fluid dynamic force created by the vortex shedding must detect the vortex signals selectively and reject the noise signals.

BRIEF SUMMARY OF THE INVENTION

The primary object of the present invention is to provide a transducer assembly comprising a first planar Piezo electric element contained in a first cavity included in a first rigid cylindrical body and pressed against a thin end wall of the first cavity, which first planar Piezo electric element has a pair of electrodes disposed on two opposite sides of a reference plane perpendicular to the thin wall and generally including the central axis of the thin end wall, and a second planar Piezo electric element contained in second cavity included in a second rigid cylindrical body and pressed against a thin end wall of the second cavity, which second planar Piezo electric element has a pair of electrodes disposed on two opposite sides of the reference plane, wherein the first and second rigid cylindrical bodies are connected to one another in a coaxial arrangement by a flexible section connecting the thin end wall of the first cavity and a thick end wall of the second cavity opposite to the thin end wall of the second cavity, and a force transmitting member extends from the thin end wall of the second cavity, which force transmitting member is connected to a fluid dynamic force receiving member by a mechanical coupling or an extension of the force transmitting member forms a fluid dynamic force receiving member. The electrical signals from each pair of the electrodes are combined in such a way that the noises generated by the structural vibrations are canceled threbetween as much as possible and then the two combined signals respectively supplied by the two planar Piezo electric elements are further combined to further cancel the noises therebetween.

Another object is to provide a transducer assembly comprising a planar Piezo electric element contained in a cavity included in a rigid cylindrical body and pressed against a thin end wall of the cavity, which planar Piezo electric element has a pair of electrodes disposed on two opposite sides of the reference plane, wherein the rigid cylindrical body is supported by a flexible extension extending from a thick end wall opposite to the thin end wall, and a force transmitting member extends from the thin end wall, which force transmitting member is connected to a fluid dynamic force receiving member or an extension of the force transmitting member forms a fluid dynamic force receiving member. The electrical signals from the pair of electrodes are combined in such a way that the noises generated by the structural vibrations are canceled therebetween and a refined signal representing the vortex shedding is obtained.

These and other objects of the present invention will become clear as the description thereof pregresses.

BRIEF DESCRIPTION OF THE FIGURES

The present invention may be described with a great clarity and specificity by referring to the following figures:

FIG. 8 illustrates operating principles of the vortex sensor converting a fluid dynamic force to an electrical signal.

FIG. 9 illustrates operating principles of the vortex sensor converting a structural vibration to an electrical signal, wherein the fluid dynamic force receiving member has a relatively high stiffness.

FIG. 10 illustrates operating principles of the vortex sensor converting a structural vibration to an electrical signal, wherein the fluid dynamic force receiving member has a relatively low stiffness.

FIGS. 11a and 11b illustrate operating principles of the vortex sensor, wherein the fluid dynamic force receiving member has a stiffness and mass distribution matched to one another.

DESCRIPTION OF THE ILLUSTRATED EMBODIMENTS

Figure 1:
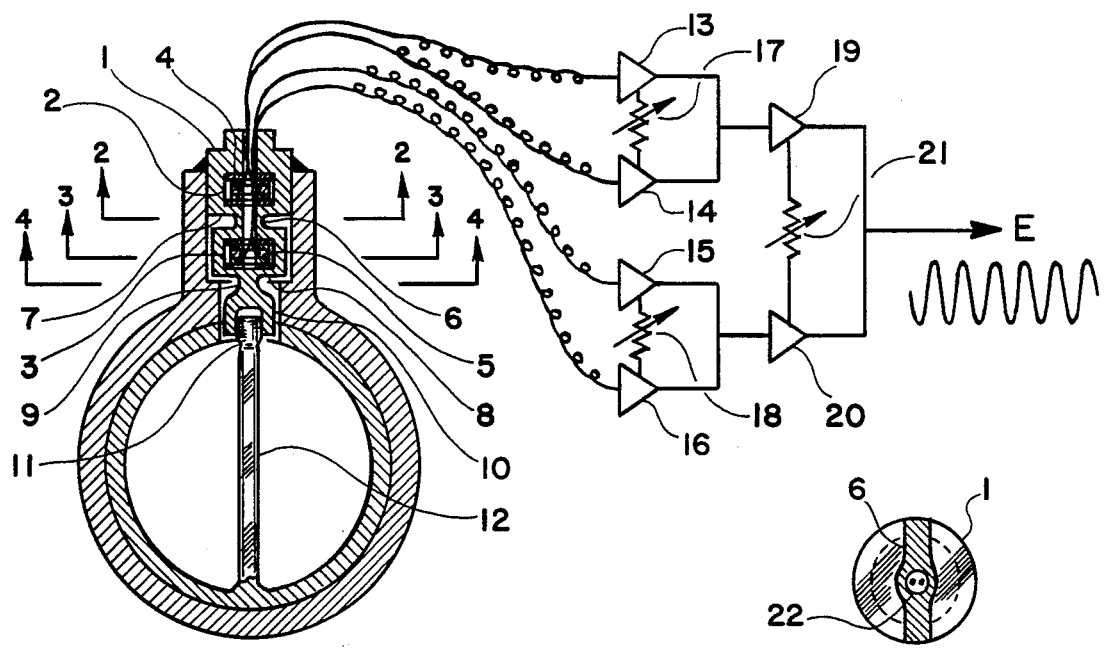
FIG. 1 illustrates a cross section of an embodiment of the vortex sensor of the present invention taken along a plane perpendicular to the direction of the fluid flow.
Figure 12:
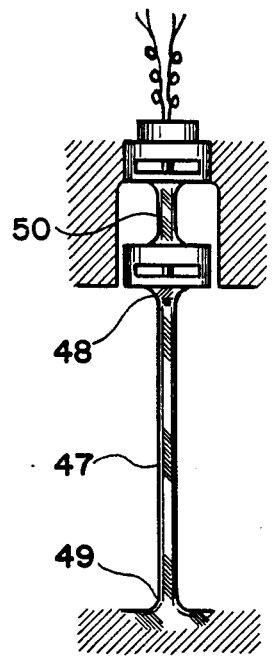
FIG. 12 illustrates a cross section of another embodiment of the vortex sensor.
Figure 13:
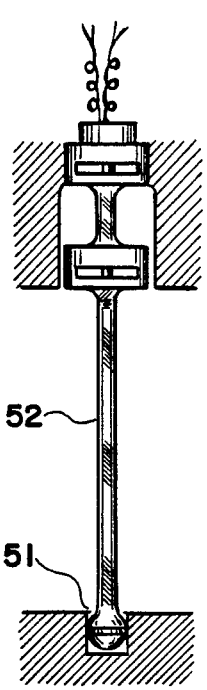
FIG. 13 illustrates a cross section of a further embodiment of the vortex sensor.
Figure 14:
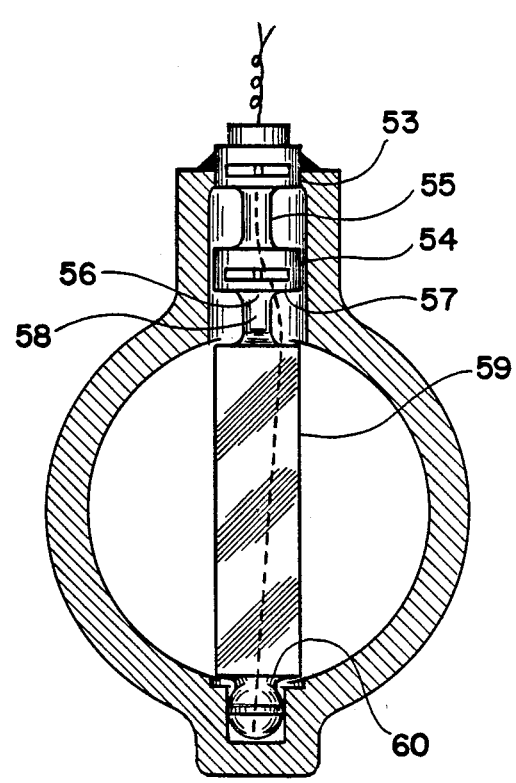
FIG. 14 illustrates a cross section of an embodiment of the vortex shedding flowmeter comprising a vortex generator-sensor constructed in accordance with the principles of the present invention.
Figure 17:
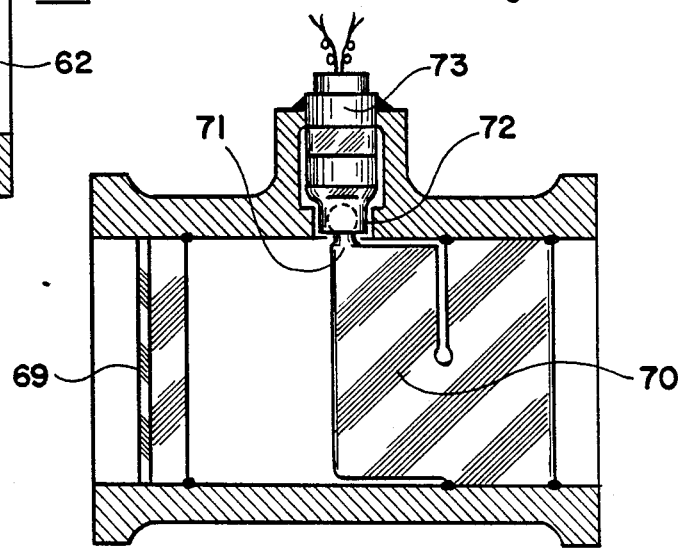
FIG. 17 illustrates a cross section of the vortex shedding flowmeter comprising a separate vortex generator and sensor constructed in accordance with the principles of the present invention.

In FIG. 1 there is illustrated a cross section of an embodiment of the vortex sensor constructed in accordance with the principles of the present invention, that is incorporated into a vortex shedding flowmeter such as that shown in FIG. 17. The vortex sensor comprises a transducer container vessel 1 of a circular cylindrical shape that has two cavities 2 and 3 respectively containing a pair of planar Piezo electric elements 4 and 5 disposed perpendicular to the central axis of the transducer container vessel 1. The two stocky sections of the transducer container vessel 1 respectively including the two cavities 2 and 3 are connected to one another by a thin section 6 therebetween and the two cavities 2 and 3 respectively include two thin end walls 7 and 8. The planar Piezo electric elements 4 and 5 are respectively disposed parallel to the two thin end walls 7 and 8 and pressed thereagainst. The thin section 6 connects the thin end wall 7 of the first cavity 2 to the thick end wall of the second cavity 3 opposite to the thin end wall 8. The thin end wall 8 includes a reinforcing rib 9 disposed diametrically thereacross on a plane including the central axis of the transducer container vessel and parallel to the direction of the fluid flow, which reinforcing rib 9 anchores an elongated force transmitting member 10 extending from the thin end wall 8. The force transmitting member 10 includes a mechanical coupling means at the extremity thereof, that connects the extremity of the force transmitting member to a deflective portion of a fluid dynamic force receiving member 12 such as a planar member disposed downstream of a vortex generating bluff body. As shown in FIG. 12, 13 or 14, the force transmitting member 10 may be extended to form a fluid dynamic force receiving member in a structurally continuous and integrated arrangement. Each of the two planar Piezo electric elements 4 and 5 has two electrodes respectively disposed on two opposite sides of a reference plane including the reinforcing rib 9. The electrical signals from the pair of the electrodes included in each of the two planar Piezo electric elements 4 and 5 are supplied to each pair of the amplifiers 13 and 14 or 15 and 16, which combinations of the amplifiers have signal balancing means 17 and 18, wherein the noises generated by the structural vibration of the vortex shedding flowmeter are canceled between each pair of the amplifiers and refined signals representing the fluid dynamic force created by the vortex shedding and experienced by the fluid dynamic force receiving member 12 are obtained as the outputs from each pair of amplifiers. The two refined signals respectively provided by the two combinations of the planar Piezo electric elements and the two pairs of amplifiers, and supplied to a pair of amplifiers 19 and 20 with signal balancing means 21, are combined in such a way that the residual noises are canceled between the two amplifiers 19 and 20 and the output electrical signal E representing the vortex shedding is obtained. The fluid velocity is determined from the frequency of the alternating electrical signal E and the mass flow rate is determined from a combination of the frequency and the amplitude of the alternating electrical signal E, as the fluid velocity is proportional to the frequency of the alternating electrical signal and the dynamic pressure of the fluid flow, which is equal to one half of the fluid density times the square of the fluid velocity, is proportional to the amplitude of the alternating electrical signal E.

Figure 2:
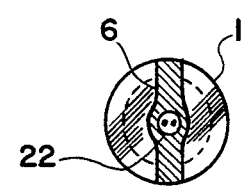
FIG. 2 illustrates another cross section of the vortex sensor shown in FIG. 1.

In FIG. 2 there is illustrated another cross section of the vortex sensor shown in FIG. 1, which cross section is taken along plane 2—2 as shown in FIG. 1. The thin section 6 is a planar section disposed on a plane parallel to the direction of the fluid flow and including the central axis of the transducer container vessel 1, that extends diametrically across the cross section of the circular cylindrical portions of the transducer container vessel containing the two planar Piezo electric elements. The central portion in the cross section of the thin section 6 includes an axial hole 22 providing a conduit for routing the conductor wires originating from the second planar Piezo electric element 5. It should be understood that the thin section 6 may have a round cross section of reduced area in place of the planar cross section. Of course the planar construction of the thin section 6 provides a definite advantage because it plays the role of a reinforcing rib adding strength to the thin end wall 7, while it probides a flexible section between the two stocky sections of the transducer container vessel housing the two planar Piezo electric elements.

Figure 3:
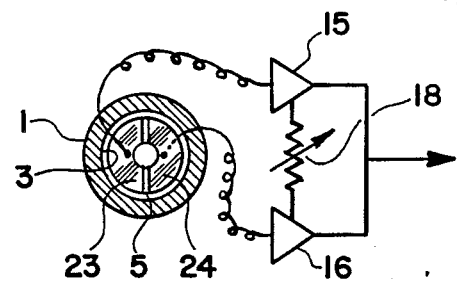
FIG. 3 illustrates a further cross section of the vortex sensor shown in FIG. 1 that shows an arrangement of the a pair of electrodes included in a planar Piezo electric element employed in the construction of the vortex sensor, and an electrode circuitry providing a noise cancellation.

In FIG. 3 there is illustrated a further cross eection of the vortex sensor shown in FIG. 1, which cross section taken along plane 3—3 as shown in FIG. 1, illustrates an arrangement of the planar Piezo electric element employed in the construction of the vortex sensor. The planar Piezo electric element 5 is disposed in the cavity 3 and is pressed against the thin end wall thereof. There is a clearance between the perimeter of the planar Piezo electric element 5 and the cylindrical wall of the cavity 3. The planar Piezo electric element 5 has two pairs of electrodes respectively disposed on the two opposite sides thereof, wherein one electrode 23 disposed on one side of the planar Piezo electric element on one side of the reference plane including the reinforcing rib 9 is connected to the first amplifier 15, and another electrode 24 disposed on the other side of the planar Piezo electric element on the other side of the reference plane is connected to the second amplifier 16. The other electrodes not connected to the amplifiers 15 and 16 may be grounded.

The fluid dynamic lift force exerted laterally on the fluid dynamic force receiving memeber 12 in directions perpendicular to a plane including the reinforcing rib 9 creates an alternating torque on the force receiving member 10 about an axis passing through the junction between the thin end wall 8 and the reinforcing rib 9. As a consequence, the two halves of the planar Piezo electric element 5 respectively located on the two opposite sides of the reference plane inlcuding the reinforcing rib 9 alternatively experiences a compression and decompression, and respectively generate electromotive forces of opposite signs to one another. The two electrodes 23 and 24 respectively disposed on the two opposite sides of the planar Piezo electric element 5 on the two opposite sides of the reference plane supply the electromotive forces of the same sign, which alternate in time, to the two amplifiers 15 and 16. The outputs from the two amplifiers 15 and 16 are combined in such a way that the noises generated by the structural vibrations of the vortex shedding flowmeter are canceled between the two amplifiers 15 and 16 by means of the signal balancing means 18 and a refined signal representing the fluid dynamic lift force experienced by the fluid dynamic force receiving member 12 is obtained. The other planar Piezo electric member 4 has the same components and arrangements as that shown in FIG. 3.

Figure 4:
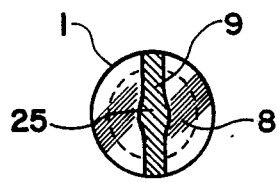
FIG. 4 illustrates yet another cross section of the vortex sensor shown in FIG. 1.

In FIG. 4 thereis illustrated yet another cross section of the vortex sensor shown in FIG. 1, which cross section is taken along plane 4—4 as shown in FIG. 1. The thin end wall 8 is reinforced by the reinforcing rib 9 disposed diametrically thereacross on a plane including the reference plane, wherein the midportion 25 anchors the force transmitting member 10 extending from the thin end wall 8. It should be understood that the reinforcing rib 9 may be omitted and the force transmitting member 10 may be anchored directly to the thin end wall 8.

Figure 5:
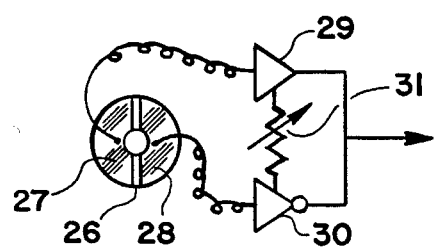
FIG. 5 illustrates another arrangement of a pair of electrodes included in a planar Piezo electric element employed in the construction of the vortex sensor and an electronic circuitry providing a noise cancellation.

In FIG. 5 there is illustrated a plan view of another arrangment of the planar Piezo electric element 26, that can be employed in the construction of the vortex sensor shown in FIG. 1 in place of the arrangement illustrated in FIG. 3. The two electrodes 27 and 28 disposed on one side of the planar Piezo electric element and respectively on the two opposite sides of the reference plane are connected to a noninverting amplifier 29 and an inverting amplifier 30, respectively, which combination of the amplifiers includes a signal balancing means 31 therebetween. The outputs from the two amplifiers are combined in such a way that the noises are canceled and the refined vortex signal is obtained.

Figure 6:
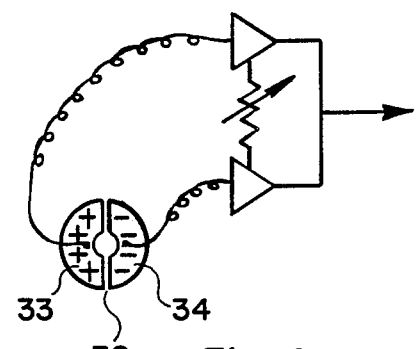
FIG. 6 illustrates a further arrangement of a pair of electrodes included in the planar Piezo electric element employed in the construction of the vortex sensor and an electronic circuitry providing a noise cancellation.

In FIG. 6 there is illustrated a plan view of a further arrangement of the planar Piezo electric element usable in place of that shown in FIG. 3. The planar Piezo electric element 32 comprises two separated halves of opposite polarizations 33 and 34 respectively disposed on the two opposite sides of the reference plane including the reinforcing rib. The electrodes of the two halves of the planar Piezo electric element 32 located on the same side of the planar Piezo electric element 32 are connected to the same pair of amplifiers as described in conjunction with FIG. 3 and operate on the same principles.

Figure 7:
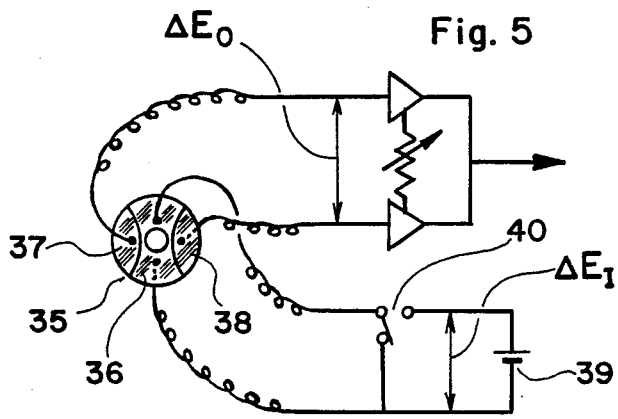
FIG. 7 illustrates an arrangement of a planar PIezo electric element employed in the construction of the vortex sensor and an electronic circuitry, which combination provides a noise cancellation and a calibration means.

In FIG. 7 there is illustrated a plan view of yet another arrangement of the planar Piezo electric element usable in place of that shown in FIG. 3. Each side of the planar Piezo electric element 35 includes a middle electrode 36 straddling the reference plane including the reinforcing rib 9 and disposed intermediate two side electrodes 37 and 38, which side electrodes are respectively connected to the same pair of amplifiers in the same arrangement as shown in FIG. 3. The two middle electrodes respectively disposed on the two opposite sides of the planar Piezo electric element 36 are connected to two opposite terminals of a test electromotive force source 39 with a potential difference $E_I$ thereacross. The normally open switch 40 short circuits the two middle electrodes when it is open. When the switch 40 is momentarily closed, it imposes an input electrical pulse $E_I$ across the two middle electrodes, which in turn creates a mechanical impulse across the planar Piezo electric element and generates an output electrical pulse $E_O$ across the two side electrodes 37 and 38. The ratio $E_I / E_O$ provides a measure of transducer efficiency in converting a mechanical impulse to an electrical pulse. By multiplying the ratio $E_I / E_O$ obtained intermittently on a real time basis during the operation of the vortex sensor to the amplitude of the alternating electrical signal E representing the vortex shedding, one can accurately obtain the amplitude of the fluid dynamic lift force experienced by the fluid dynamic force receiving member 12 from the amplitude of the alternating electrical signal E shown in FIG. 1 independent of the change in the transducer efficiency taking place due to temperature change, depolarization, mechanical fatigue, etc. One or both planar Piezo electric elements employed in the vortex sensor shown in FIG. 1 may employ the self-calibrating type of planar Piezo electric element as shown and described in conjunction with FIG. 7.

Figure 15:
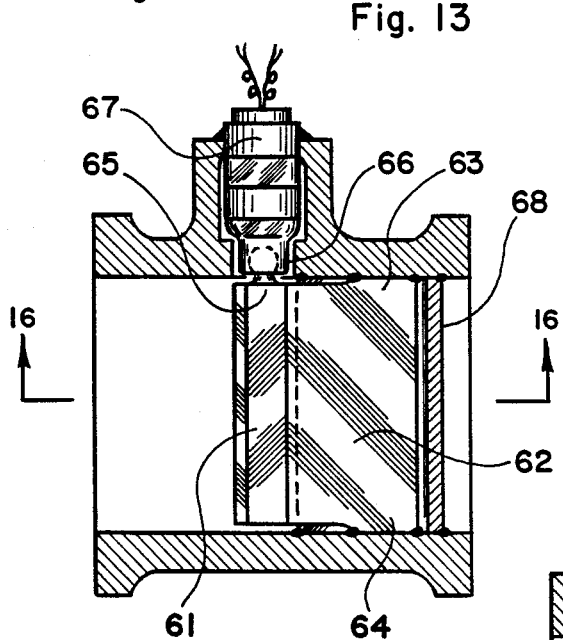
FIG. 15 illustrates a cross section of another embodiment of the vortex shedding flowmeter comprising a vortex generator-sensor.

In FIG. 8 there is illustrated the vortex sensor shown in FIG. 1 wherein the fluid dynamic lift force experienced by the fluid dynamic force receiving member 12 is converted to an electrical signal. The fluid dynamic force receiving member 12 such as a planar member disposed downstream of the vortex generating bluff body as shown in FIG. 17 or the vortex generating bluff body as shown in FIG. 15 is fixedly secured to a rigid wall 41 of the flow passage at one extremity 42 thereof, while the other extremity 43 is connected to the force transmitting member 10 by a mechanical coupling 44 such as a ball and socket joint, threaded joint, a pressure fitted joint, welded joint, etc., which mechanical coupling provides a structural joint between the force transmitting member 10 and the fluid dynamic force receiving member that provides a joint with a greater flexibility compared with the other portion of the combination. The fluid dynamic lift force L on the fluid dynamic force receiving member 12 exerts a force F on the force transmitting member 10 in the same direction as the fluid dynamic lift force, which compresses the first halves of the planar Piezo electric elements 4 and 5 located on one side of the reference plane including the reinforcing rib 9, and decompresses the second halves of the planar Piezo electric elements 4 and 5 located on the other side of the reference plane. In other words, the compression and decompression mode of the two halves of the planar Piezo electric element created by the fluid dynamic lift force is the same for the two planar Piezo electric elements 4 and 5.

In FIG. 9 there is illustrated the same vortex sensor as that shown in FIG. 8, which is experiencing inertia forces resulting from a lateral vibration of the flowmeter body supporting the vortex sensor. The stiffness of the thin section 7 connecting the two stocky sections of the transducer container vessel respectively containing the two planar Piezo electric elements 4 and 5, and the stiffness of the fluid dynamic force receiving member 12 are selected in such a way that the inertia force Ma of the lower half of the transducer container vessel 1 creates a greater lateral deflection at the extremity of the force transmitting member 12 compared with the lateral deflection experienced by the extremity of the fluid dynamic force receiving member 12 from the inertia force ma of the fluid dynamic force receiving member 12 when the force transmitting member and the fluid dynamic force receiving member are not connected to one another. In more plain language, the fluid dynamic force receiving member 12 provides a structural support to the force transmitting member 12. As a consequence, the relative force F experienced by the force transmitting member 10 is in the opposite direction compared with the direction of the inertia force ma and Ma. When the thin section 7 of the transducer container vessel is relatively flexible and the lower half of the transducer container vessel 1 has a relatively high mass, the compression and decompression mode of the two halves of the planar Piezo electric element 4 and 5 have opposite signs as shown by the signs appearing in front od $\Delta p$ in FIG. 9.

The two combinations of the amplifiers 13 and 14, and 15 and 16 are respectively balanced in such a way that the two electromotive forces respectively generated by the two halves of each planar Piezo electric element under the structural vibration of the flowmeter in directions parallel to the central axis of the transducer container vessel 1 are canceled. The combination of the amplifiers 19 and 20 is balanced to cancel the two electromotive forces of opposite signs respectively generated by the two planar Piezo electric element 4 and 5 under the structural vibrations of the flowmeter body in directions perpendicular to the fluid dynamic force receiving member 12. The vortex sensor with the amplifiers adjusted in the aforementioned manner provides a pure vortex signal because the fluid dynamic force generates electrical signals of the same signs from the two planar Piezo electric elements 4 and 5, while the lateral structural vibrations of the vortex sensor generates signals of opposite signs from the two planar Piezo electric elements 4 and 5, which signals of opposite signs are canceled therebetween.

In FIG. 10 there is illustrated the same vortex sensor as that shown in FIG. 8, wherein the relative stiffness of the fluid dynamic receiving member 12 is substantial, but insufficient to act as a structural support supporting the force transmitting member 10. In this case, the relative force on the force transmitting member 10 is in the same direction as that of the inertia force Ma and ma. The ratio of the mass of the lower half of the transducer container vessel 1 to the stiffness of the thin section 7 can be selected in such a way that the degree of compression and decompression experienced by the two halves of each of the two planar Piezo electric elements have the same signs, but differ in magnitude. The amplifiers can be adjusted to cancel out the noises generated by the structural vibrations of the flowmeter and still detect the vortex signal, because the difference in the level of the two electrical signals respectively generated by the two planar Piezo electrical elements 4 and 5 is different between the vortex signal and noise signal and consequently, the latter can be canceled out without canceling out the former.

In FIG. 11 there is illustrated an embodiment of a vortex sensor having a construction similar to that shown in FIG. 1, wherein the mass and stiffness are perfectly matched, whereby the structural vibrations of the flowmeter body produces zero compression-decompression in the planar Piezo electric element 45 contained within a cavity included in the lower half of the transducer container vessel 46. The particular case shown in FIG. 11(a) is an intermediate state between the two cases respectively shown in FIGS. 9 and 10, which intermediate state has the planar Piezo electric element 45 disposed at a section of inflection of the deformation mode of the vortex sensor as shown in FIG. 11(b). Since the planar Piezo electric element 45 disposed at a section of inflection whereat the second derivative of deflection y" vanishes does not sense noise signals, the second planar Piezo electric element equivalent to the element 4 shown in FIG. 1 can be omitted. Of course the amplifiers 15, 16, 19 and 20 can also be omitted.

In FIG. 12 there is illustrated another embodiment of the vortex sensor that has essentially the same construction as that shown in FIG. 1 and operates on the same principles. In this embodiment, the force transmitting member and the fluid dynamic force receiving member are integrated into a single structurally integral element 47 of an elongated planar or columnar shape extending from the reinforcing rib 48 of the thin wall. The extremity 49 of the elongated planar or columnar member 47 may be fixedly secured to the wall of the flow passage. In order to compensate for the lack of flexibility provided by the mechanical coupling 11 included in the embodiment shown in FIG. 1 that is now absent, the thin section 50 connecting the two sections of the transducer container vessel respectively containing the two planar Piezo electric elements may have an increased length.

In FIG. 13 there is illustrated a further embodiment of the vortex sensor having essentially the same construction as the embodiment shown in FIG. 12 with one exception, which exception is the extremity 51 of the elongated planar or columnar member 52 that is now simply secured to the wall of the flow passage. If the structure of the vortex sensor has an inflection point in the deflection under mechanical vibration as described in conjunction with FIG. 11, a single planar Piezo electric element disposed on the section of inflection may be employed in the construction of the vortex sensor shown in FIG. 12 or 13.

In FIG. 14 there is illustrated an embodiment of the vortex shedding flowmeter employing the vortex sensor constructed in accordance with the principles of the present invention. The vortex sensor comprises a transducer container vessel including the first and second stocky sections 53 and 54 containing the two planar Piezo electric elements, which two sections are connected to one another by a flexible section 55. The reinforcing rib 56 of the thin end wall 57 of the second stocky section 54 of the transducer container vessel extends to a flexible section 58 that extends to a vortex shedding bluff body 59 of an elongated columnar shape. The extremity 60 of the bluff body 59 is simply secured to the wall of the flow passage, while the first stocky section 53 of the transducer container vessel is fixedly secured to the flowmeter body. When the mass and stiffness distribution along the length of the vortex sensor is matched in such a way that there is a section of inflection in the deflection mode of the vortex sensor under mechanical vibrations as shown by the broken line, only a single planar Piezo electric element disposed at the section of inflection may be included in the construction of the vortex shedding flowmeter.

In FIG. 15 there is illustrated another embodiment of the vortex shedding flowmeter employing the vortex sensor of the present invention. The vortex generating bluff body 61 disposed across a flow passage includes a planar trailing edge 62 that is secured to the wall of the flow passage at one or both extremities 63 and 64 thereof. One extremity 65 of the bluff body 61 is connected to the force transmitting member 66 extending from the reinforcing rib of a thin end wall of the transducer container vessel 67 that includes two or one planar Piezo electric elements as shown in FIG. 1 or 11. The planar trailing edge 62 of the bluff body 61 is shrouded by a pressure shield 68 having an U-shaped cross section, that is secured to the wall of the flow passage at the two extremities thereof.

Figure 16:
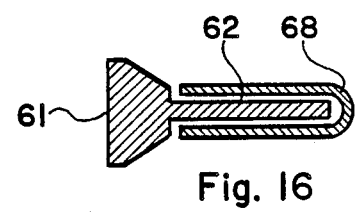
FIG. 16 illustrates a cross section of the vortex generator-sensor included in the embodiment shown in FIG. 15.

In FIG. 16 there is illustrated a cross section of the combination of the bluff body 61 and the pressure shield 68 included in the vortex shedding flowmeter shown in FIG. 15. The planar trailing edge 62 of the bluff body 61 shrouded by the pressure shield 68 on three sides amplifies the fluid dynamic lift force created by the fluctuating fluid pressure at the two sides of the bluff body in an alternating mode and, consequently, provides an additional sensitivity to the vortex shedding flowmeter.

In FIG. 17 there is illustrated a further embodiment of the vortex shedding flowmeter employing the vortex sensor of the present invention, which comprises a vortex generating bluff body 69 disposed across a flow passage and a planar member 70 disposed downstream of and parallel to the bluff body 69 across the flow passage on a plane generally parallel to the central axis of the flow passage, wherein at least one extremity of the planar member 70 is secured to the wall of the flow passage. A deflective portion 71 of the planar member such as an over-hanging extremity is connected to the force transmitting member 72 extending from the reinforcing rib of a thin end wall of the transducer container vessel 73 that includes two or one planar Piezo electric elements as shown in FIG. 1 or 11. It should be noticed that the first stocky section disposed at one extremity of the transducer container vessel 73 opposite to the force transmitting member 72 is fixedly secured to the flowmeter body, while the second stocky section and the force transmitting member are disposed in an isolated arrangement from the flowmeter body.

While the principles of the present inventions have now been made clear by the illustrative embodiments, there will be many modifications of the structures, arrangements, proportions, elements and materials immediately obvious to those skilled in the art, which are particularly adapted to the specific working environments and operating conditions in the practice of the invention without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention in which an exclusive property or priviledge is claimed, are defined as follows:

1. A device for sensing impulses comprising in combination:
   (a) a transducer container vessel including a first and second stocky sections connected to one another by a midsection of a reduced cross section area;
   (b) a first Piezo electric element disposed within a first cavity included in the first stocky section of the transducer container vessel and pressed against a thin end wall of the first cavity adjacent to said midsection and perpendicular to the central axis of the transducer container vessel extending through the first and second stocky sections and said midsection of the transducer container vessel, wherein said first Piezo electric element includes at least two electrodes respectively disposed on the two opposite sides of a reference plane including said central axis of the transducer container vessel;
   (c) a second Piezo electric element disposed within a second cavity included in the second stocky section of the transducer container vessel and pressed against a thin end wall of the second cavity perpendicular to said central axis, said thin end wall being a part of one end of the second stocky section opposite to said midsection of the transducer container vessel, wherein said second Piezo electric element includes at least two electrodes respectively disposed on the two opposite sides of said reference plane;
   (d) a force transmitting member extending from said thin end wall of the second cavity in a direction generally parallel to said central axis; and
   (e) a force receiving member disposed generally parallel to said reference plane and connected to the force transmitting member at one extremity and secured to a rigid structural member at a portion of the force receiving member away from said one extremity, wherein the first stocky section of the transducer container vessel is secured to the rigid structural member;

wherein two electrical signals respectively supplied by the two electrodes of the first Piezo electric element are combined to eliminate noise and obtain a first electrical signal representing forces experienced by said force receiving member, and two electrical signals respectively supplied by the two electrodes of the second Piezo electric element are combined to eliminate noise and obtain a second electrical signal representing forces experienced by said force receiving member, wherein said first and second electrical signals are combined to further eliminate noise.

2. The combination as set forth in claim 1 wherein the thin end wall of the second cavity includes a reinforcing rib disposed diametrically thereacross on said reference plane and the force transmitting member extends from the reinforcing rib.

3. The combination as set forth in claim 1 wherein the thin end wall of the first cavity includes a reinforcing rib disposed diametrically thereacross on said reference plane and said midsection of a reduced cross section area extends from the reinforcing rib.

4. The combination as set forth in claim 1 wherein said one extremity of the force receiving member is connected to the force transmitting member by a mechanical coupling.

5. The combination as set forth in claim 1 wherein the force receiving is an extension of the force transmitting member arranged in a structurally integrated relationship.

6. The combination as set forth in claim 1 wherein the force receiving member comprises a vortex generating bluff body of an elongated cylindrical shape disposed across a flow passage.

7. The combination as set forth in claim 1 wherein the force receiving member comprises a planar member disposed across a flow passage downstream of and parallel to a vortex generating bluff body of an elongated cylindrical shape disposed across the flow passage.

8. The combination as set forth in claim 1 wherein at least one of the first and second Piezo electric elements includes a pair of middle electrodes respectively disposed on the two opposite sides of the Piezo electric element and straddling said reference plane wherein an input electrical pulse of known amplitude across the pair of middle electrodes creates a mechanical impulse on the Piezo electric element and in turn generates an output electrical pulse across the two electrodes of the Piezo electric element; wherein the amplitude ratio of the input electrical pulse to the output electrical pulse is used as a calibration standard in determining the magnitude of forces experienced by the force receiving member from the amplitude of the electrical signals generated by said device.

9. A device for sensing impulses comprising in combination:
   (a) a transducer container vessel including a stocky cylindrical section and an extension of a reduced cross section area extending from one end of the stocky cylindrical section in a first direction;
   (b) a Piezo electric element disposed within a cavity included in the stocky cylindrical section and pressed against a thin end wall of the cavity, said thin end wall being a part of the other end of the stocky cylindrical section opposite to said one end, wherein the Piezo electric element includes at least two electrodes respectively disposed on the two opposite sides of a reference plane including the central axis of the transducer container vessel extending through the stocky cylindrical section and the extension of a reduced cross section area;
   (c) a force transmitting member extending from said thin wall generally parallel to the central axis of the transducer container vessel in a second direction opposite to said first direction; and
   (d) a force receiving member disposed generally parallel to said reference plane and connected to the force transmitting member at one extremity and secured to a rigid structural member at a portion of the force receiving member away from said one extremity, wherein the extension of a reduced cross section area is secured to the rigid structural member at the extremity thereof and the Piezo electric element is disposed at a section generally coinciding with a section of inflection in a lateral deflection of the combination of the transducer container vessel, the force transmitting member and the force receiving member created by a lateral inertia force thereof;

wherein two electrical signals respectively supplied by the two electrodes of the Piezo electric element are combined to eliminate noise and obtain an electrical signal representing forces of noninertia origin experienced by the force receiving member.

10. The combination as set forth in claim 9 wherein the thin end wall includes a reinforcing rib disposed diametrically thereacross on said reference plane and the force transmitting member extends from the reinforcing rib.

11. The combination as set forth in claim 9 wherein said one extremity of the force receiving member is connected to the force transmitting member by a mechanical coupling.

12. The combination as set forth in claim 9 wherein the force transmitting member extends to the force receiving member in a structurally continuous manner.

13. The combination as set forth in claim 9 wherein the force receiving member comprises a vortex generating bluff body of an elongated cylindrical shape disposed across a flow passage.

14. The combination as set forth in claim 9 wherein the force receiving member comprises a planar member disposed across a flow passage downstream of and parallel to a vortex generating bluff body of an elongated cylindrical shape disposed across the flow passage.

15. The combination as set forth in claim 9 wherein the Piezo electric element includes a pair of middle electrodes respectively disposed on the two opposite sides of the Piezo electric element and straddling said reference plane, wherein an input electrical pulse of known amplitude across the pair of middle electrodes creates a mechanical impulse on the Piezo electric element and in turn generates an output electrical pulse across the two electrodes of the Piezo electric element; wherein the amplitude ratio of the input electrical pulse to the output electrical pulse is used as a calibration standard in determining the amplitude of forces experienced by the force receiving member from the amplitude of the electrical signal generated by said device.

* * * * *